United States Patent [19]

Lodini

[11] Patent Number: 4,900,497

[45] Date of Patent: Feb. 13, 1990

[54] PROCESS FOR PRODUCING ELECTRIC RESISTORS HAVING A WIDE RANGE OF SPECIFIC RESISTANCE VALUES

[75] Inventor: Paolo Lodini, Turin, Italy

[73] Assignee: LEDA Logarithmic Electrical Devices for Automation S.r.l., Turin, Italy

[21] Appl. No.: 145,612

[22] Filed: Jan. 19, 1988

[30] Foreign Application Priority Data

Feb. 5, 1987 [IT] Italy .............................. 67072 A/87

[51] Int. Cl.[4] ........................ B29C 45/14; C04B 35/52

[52] U.S. Cl. .................................... 264/104; 264/105; 264/114; 264/120; 264/128

[58] Field of Search ............... 264/104, 105, 108, 114, 264/120, 128

[56] References Cited

U.S. PATENT DOCUMENTS

| | | | |
|---|---|---|---|
| 2,774,108 | 12/1956 | Wyllie | 264/128 |
| 3,714,312 | 1/1973 | Nitta et al. | 264/108 |
| 4,350,652 | 9/1982 | Theysohn | 264/104 |
| 4,443,172 | 4/1984 | Riley et al. | 425/112 |
| 4,732,717 | 3/1988 | Yanagida et al. | 264/22 |

FOREIGN PATENT DOCUMENTS

| | | | |
|---|---|---|---|
| 153785 | 9/1985 | European Pat. Off. | 264/114 |
| 58-134721 | 8/1983 | Japan | 264/104 |
| 59-124825 | 7/1984 | Japan | 264/104 |
| 61-249713 | 11/1986 | Japan | 264/104 |

*Primary Examiner*—Jan H. Silbaugh
*Assistant Examiner*—Mary Lynn Fertig
*Attorney, Agent, or Firm*—Klauber & Jackson

[57] ABSTRACT

A process consisting in preparing a homogeneous system comprising particles of a first electrically conductive material arranged in substantially uniform manner inside a mass of a second liquid material which, when solidified, is both flexible and electrically insulating; and in solidifying the aforementioned mass of the aforementioned second liquid material, so as to form a matrix for supporting the aforementioned particles; throughout solidification of the aforementioned second material, a given pressure being applied on the system for the purpose of producing triaxial precompression of the aforementioned second material when solidified.

13 Claims, 5 Drawing Sheets

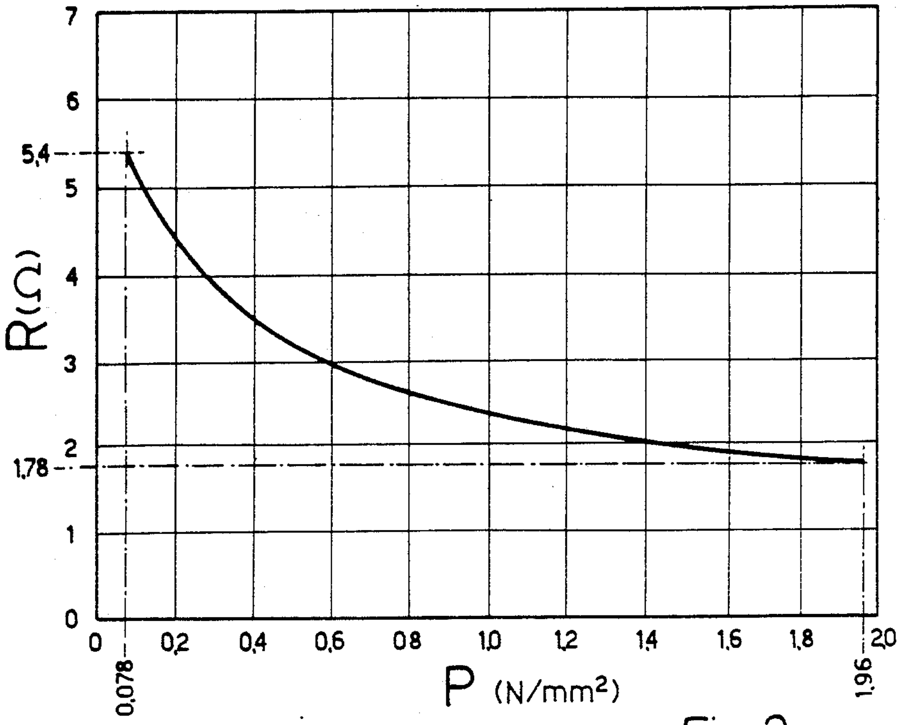
Fig. 3
Fig.4
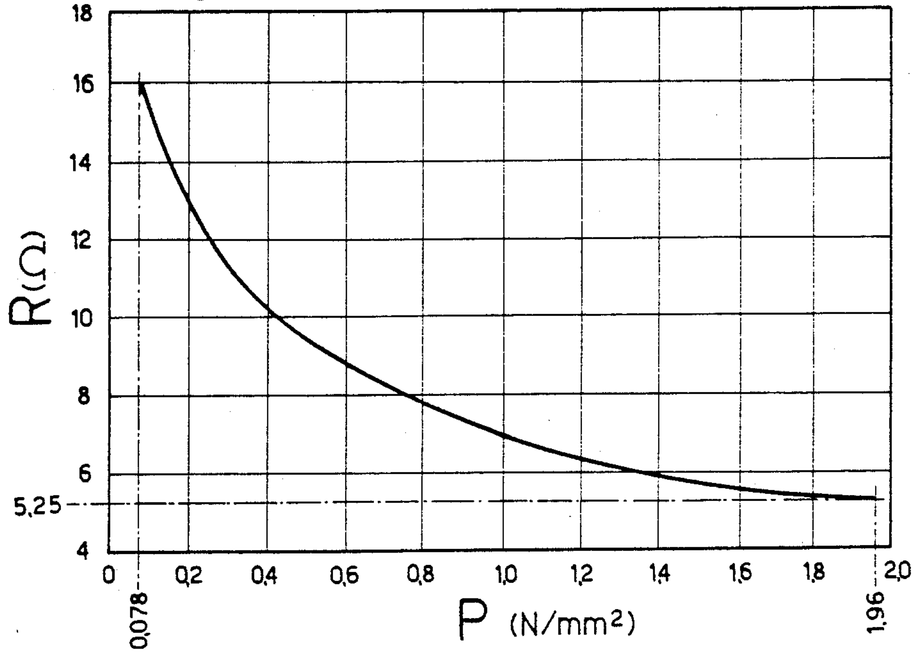

PROCESS FOR PRODUCING ELECTRIC RESISTORS HAVING A WIDE RANGE OF SPECIFIC RESISTANCE VALUES

BACKGROUND OF THE INVENTION

The present invention relates to a process for producing an electric resistor designed for use as a conducting element on an electric circuit; said resistor presenting a high conducting capacity selectable from within a wide range and, more especially, being capable of varying its electrical resistance as a function of the pressure exerted on the resistor itself.

Electrical resistors are known, substantially comprising a matrix formed from flexible insulating material, e.g. synthetic plastic, and some sort of powdered metal dispersed inside the said matrix. For producing the said resistors, a number of processes have been proposed, all of which, however, substantially come down to two basic types.

In one, the matrix consists of a sponge of insulating material defining a number of cells, inside which the powdered material is dispersed by passing a suitable liquid containing the suspended powder through the sponge. In the other, the matrix material is liquified and blended mechanically with the powdered material, so as to produce a mixture of powdered material inside the liquid matrix material, which is then solidified.

Resistors so formed present a number of drawbacks. Firstly, they cannot be used as conducting elements on electric circuits, due to the exceptionally high resistance they present when idle. Specific conducting capacity is sufficiently high for this purpose only when the resistors are subjected to fairly high pressure. On resistors of this sort, electrical resistance decreases alongside increasing pressure, but, when idle, with no external pressure applied, resistance is substantially infinite. Secondly, the electrical characteristics of such resistors do not remain constant throughout their working life, and are difficult to repeat productionwise. For overcoming this drawback, processes have been proposed whereby the powdered material dispersed inside the matrix is produced by blending powders of specific types and grades, and specific physical and chemical characteristics. Such processes, however, are both complex and high-cost, due to the equipment involved, and the cost of raw materials and processing for producing the required powdered material.

SUMMARY OF THE INVENTION

The aim of the present invention is to provide a process for producing electric resistors of the aforementioned type, but involving none of the aforementioned drawbacks; which process comprises a small number of easily repeatable stages, and employs only low-cost, readily available raw materials.

The said process is characterised by the fact that it consists in preparing a homogeneous system comprising particles of a first electrically conductive material arranged in substantially uniform manner inside a mass of a second liquid material which, when solidified, is both flexible and electrically insulating; and in solidifying the said mass of the said second liquid material, so as to form a matrix for supporting the said particles; throughout solidification of the said second liquid material, a given pressure being applied on the system for the purpose of producing triaxial precompression of the said second material when solidified.

For conveniently preparing the said homogeneous system, a structure of the said particles is first formed; which structure statistically presents each of the said particles arranged at least partially contacting the adjacent particles with which it defines a number of gaps which are subsequently injected with the said mass of the said second liquid material.

The said process conveniently comprises at least a first stage, in which is formed a mass of particles of the said first material; a second stage, in which the said mass is compacted by subjecting it to a given pressure; a third stage, in which the said mass is injected with the said second material in its liquid form, so as to fill the said gaps between the said particles and so form the said homogeneous system; and a fourth stage, in which the said second material is solidified.

DESCRIPTION OF THE DRAWINGS

For clearly illustrating the structural characteristics of the electric resistor according to the present invention, and the various stages in the process for producing the same, both will now be described in more detail with reference to the accompanying drawings, in which.

Figure 7:
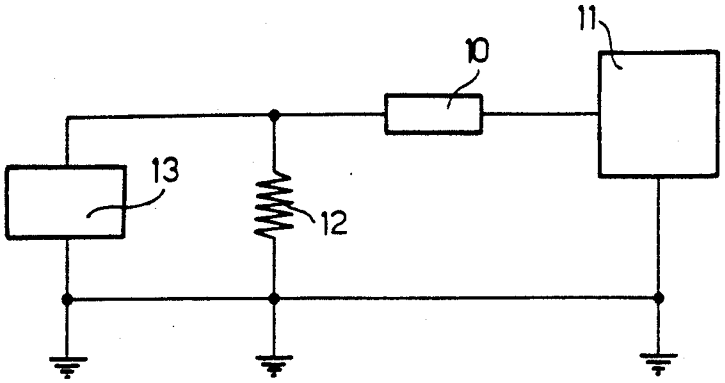
Figure 6:
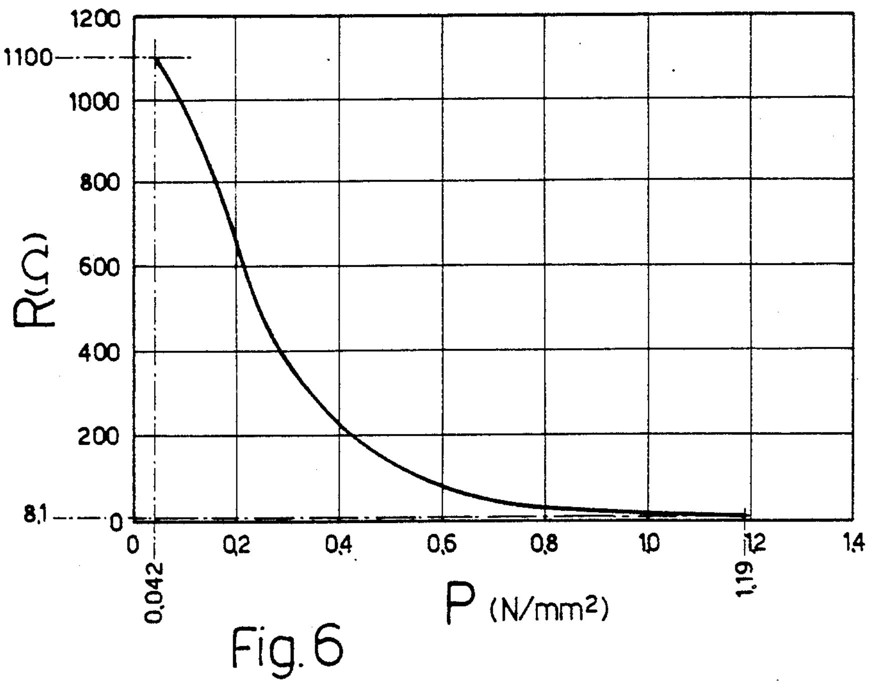

The graphs in FIGS. 3 to 6 show the variations in electrical resistance of the resistor according to the present invention, as a function of the pressure exerted on the resistor itself;

FIG. 7 shows a schematic diagram of a test circuit arrangement for plotting the results shown in FIGS. 3 to 6;

FIGS. 8 to 12 show schematic diagrams of the basic stages in the process for producing the electric resistor according to the present invention.

DETAILED DESCRIPTION OF THE INVENTION

To enable a clearer understanding of the process according to the present invention, a description will first be given of the structure of the resistor so formed.

Figure 1:
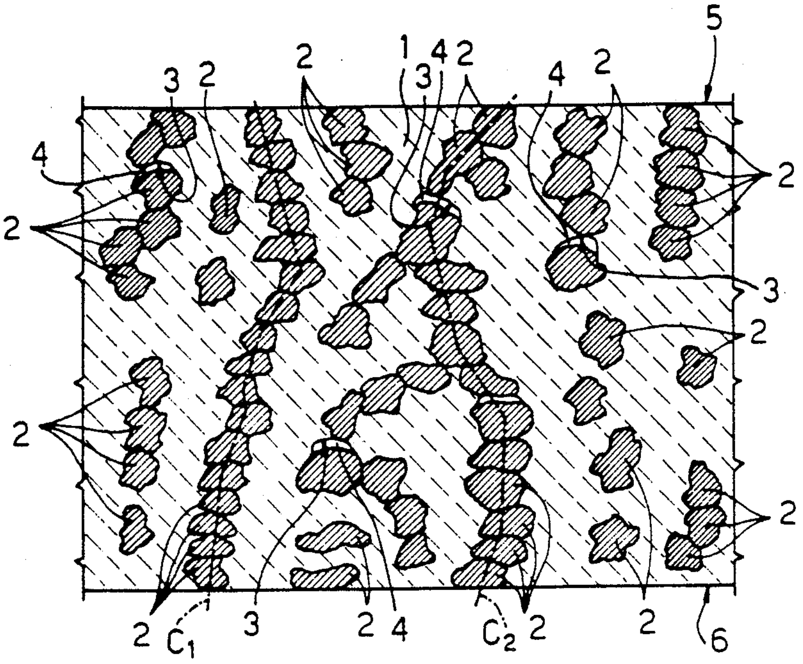
FIGS. 1 and 2 show two structural sections, to different scales, of a portion of the resistor according to the present invention.
Figure 2:
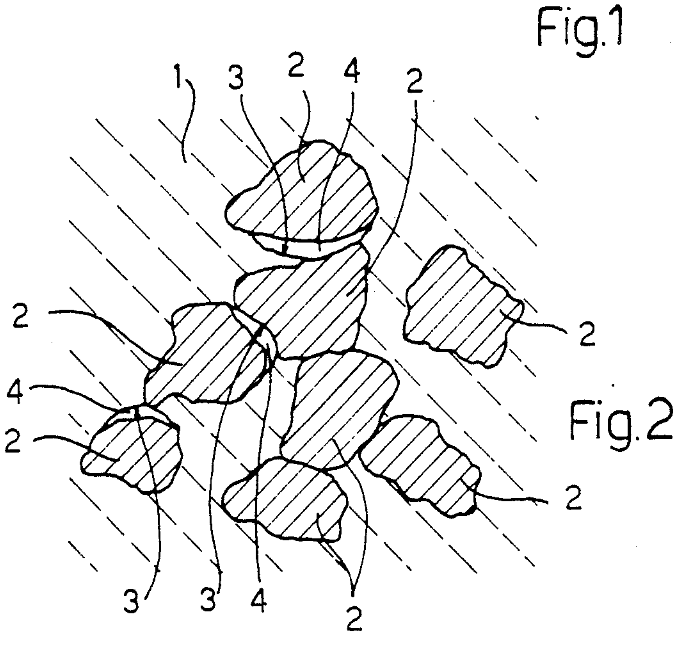
Figure 5:
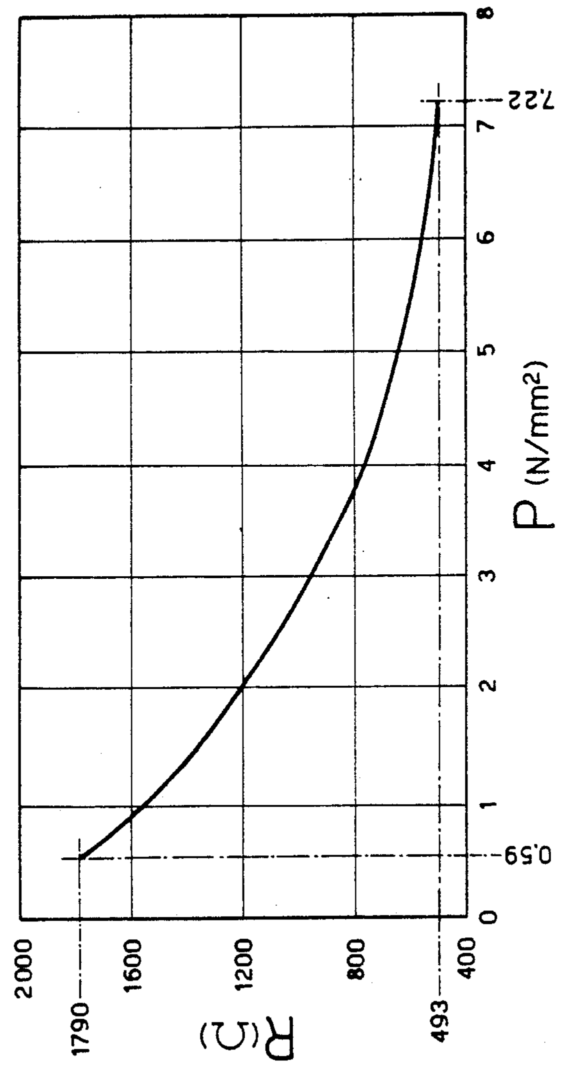

The structure of the resistor according to the present invention is as shown in FIGS. 1 and 2, which show sections of a portion of the resistor enlarged a few hundred times.

The said resistor substantially comprises a supporting matrix 1, formed from flexible, electrically insulating material, and particles 2 of electrically conductive material arranged in substantially uniform manner inside corresponding cells 3 on the said matrix 1. As in the embodiment shown, the said particles preferably consist of granules of electrically conductive material. As shown in the larger-scale section in FIG. 2, at least some (e.g. 50 to 90%) of the said cells communicate with one another, and, in a number of cases, are exactly the same shape and size as the granules contained inside. Other cells, on the other hand, are slightly larger than the said granules, so as to form a minute gap 4 between at least part of the outer surface of the granule and the corresponding inner surface portion of the respective cell.

The arrangement of cells 3, and therefore also of granules 2, inside matrix 1 is entirely random. Though the advantages of the resistor according to the present invention are obtainable even if only a few of cells 3 communicate with one another, it is nevertheless preferable for most of them to do so. For best results, the estimated percentage of communicating cells is around 50–90%.

Though conducting granules 2 may be of any size, this conveniently ranges between 10 and 250 microns. Likewise, granules 2 may be of any shape and, in this case, are preferably irregular, as shown in FIGS. 1 and 2.

Matrix 1 may be formed from any type of electrically insulating material, providing it is flexible enough to flex, when a given pressure is applied on the resistor, and return to its original shape when such pressure is released. Furthermore, the material used for the matrix must be capable of assuming a first state, in which it is sufficiently liquid for it to be injected into a granule structure statistically presenting each of the said granules arranged at least partially contacting the adjacent granules with which it defines a number of gaps; and a second state in which it is both solid and flexible. The viscosity of the liquid material conveniently ranges from 500 to 10,000 centipoise.

Matrix 1 may conveniently be formed from synthetic resin, preferably a synthetic thermoplastic resin, which presents all the aforementioned characteristics and is thus especially suitable for injection into a granule structure of the aforementioned type.

Though the size of granules 2, which depends on the size of the resistor being produced, is not a critical factor, the said granules are preferably very small, ranging in size from 10 to 250 microns.

The conducting material used for the granules may be any type of metal, e.g. iron, copper, or any type of metal alloy, or non-metal material, such as graphite or carbon. The materials for matrix 1 and granules 2 may thus be selected from a wide range of categories, providing they present the characteristics already mentioned.

The material employed for matrix 1, which, as already stated, must be flexible and insulating, is preferably, though not necessarily, so precompressed inside matrix 1 itself as to exert sufficient pressure on particles 2 to maintain contact between the same. It follows, therefore, that each minute element of the said matrix 1 material is in a sufficiently marked state of triaxial precompression as to exert on adjacent elements, in particular particles 2, far greater stress, for producing contact pressure between the surfaces of the said particles, than if the said triaxial precompression were not provided for. As will be made clearer later on, such a state of triaxial precompression is a direct consequence of the process according to the present invention.

With the structure described and shown in FIGS. 1 and 2, the resistor according to the present invention presents an extremely large number of granules 2 of conducting material, which granules either contact one another, or are separated from adjacent granules by extremely small gaps 4 which may be readily bridged when given pressure is applied on the resistor. This results in the formation, inside the said structure, of a number of electrical conductors, each consisting of a chain comprising an extremely large number of granules 2, which are normally already arranged contacting one another inside the said structure. Each of the said chains may electrically connect end surfaces 5 and 6 on the resistor directly, as shown by dotted line C1 in FIG. 1. Alternatively, chain may be formed inside the resistor, as shown by dotted line C2 in FIG. 1, in which the individual granules in the chain are partly arranged contacting one another directly, and partly separated solely by gaps 4. The granules in such chains may be brought into contact, as in the case of chain C1, by subjecting surfaces 5 and 6 on the resistor to a given pressure sufficient to flex the material of matrix 1 and so bridge the said gaps for bringing the adjacent granules separated by the same into direct contact.

The process according to the present invention is as follows.

The first step is to prepare a homogeneous system comprising particles, preferably granules, of a first electrically conductive material arranged in substantially uniform manner inside a mass of a second liquid material which, when solidified, is both electrically insulating and flexible. The mass of the said second liquid material is then solidified to form a supporting matrix for the granules. According to the present invention, throughout solidification of the said second material, a given pressure is applied on the system for the purpose of producing triaxial precompression of the said second material when solidified. Such pressure, which is maintained substantially constant throughout solidification, ranges from a few tenths of a $N/mm^2$ to a few $N/mm^2$.

For forming the said homogeneous system, a granule structure is first formed, which structure statistically presents each granule arranged at least partially contacting the adjacent granules, with which it defines a number of gaps which are then injected with the said second liquid material. The said second material may be liquified by simply heating it to a given temperature. For solidifying it, cooling is usually sufficient. In the case of synthetic resins, however, these must be solidified by means of curing.

The process according to the present invention may comprise the following stages.

Figure 8:
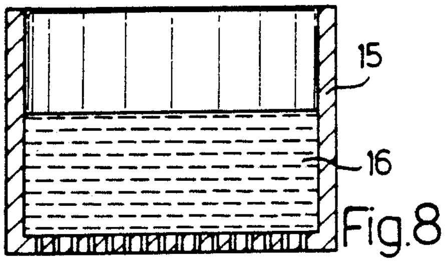

A first stage, in which a mass of electrically conductive granules 16 is formed, for example, inside an appropriate vessel 15 (FIG. 8). For this purpose, the granules, after being poured into the said vessel, are vibrated so as to enable settling. The bottom of vessel 15 is conveniently either porous or provided with holes for letting out the air or gas trapped between the granules.

Figure 9:
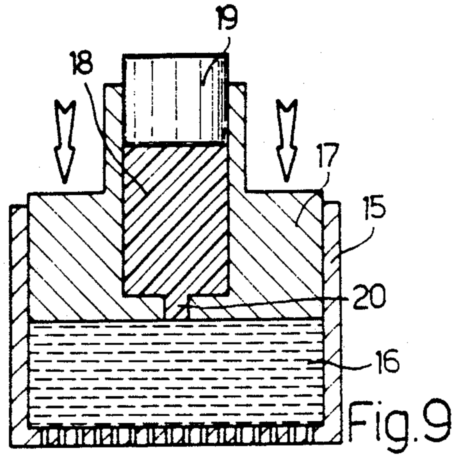

A second stage, as shown in FIG. 9, in which the mass of granules 16 is compacted by subjecting it to a given pressure, e.g. by means of piston 17, applied in any appropriate manner on the upper surface of mass 16. This produces a granule structure in which, statistically, at least part of the surface of each granule is arranged contacting surface portions of the adjacent granules, with gaps inbetween.

Figure 10:
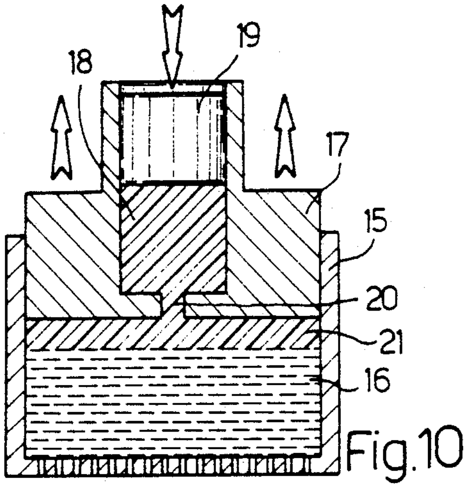
Figure 11:
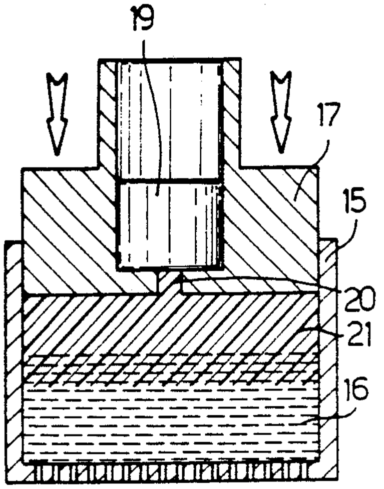

As shown in FIG. 9, piston 17 is conveniently provided with a tank 18 containing the said second material in liquid form; which liquid material may be forced, e.g. by a second piston 19, through hole 20 into a chamber 21 defined between the upper surface of granules 16 and the lower surface of piston 17, as shown clearly in FIG. 10. The said second liquid material in tank 18 is a material which may be solidified and, when it is, is both insulating and flexible. In the event the said material is liquified by heating, appropriate heating means (not shown) are also provided for.

A third stage (FIGS. 10 and 11) in which piston 19 moves down and piston 17 up, so as to force a given amount of the said second liquid material inside chamber 21 (FIG. 10). Piston 17 is then brought down for producing a given pressure inside the liquid material in chamber 21 and so forcing it to flow into the gaps between the granules in mass 16 and form, with the said granules, the said homogeneous system. At the same time, any air between the granules is expelled through the porous bottom of vessel 15. The pressure produced by piston 17, at this stage, inside the liquid material mainly depends on the size of the granules, the viscosity of the liquid, the height of the granule mass being impregnated, and required impregnating time.

Penetration of the liquid material inside the gaps in granule mass 16 has been found to have no noticeable effect on the granule arrangement produced in the compacting stage.

A fourth stage (FIG. 11) in which the homogeneous system of granules and liquid material produced in the foregoing stage is substantially solidified. This may be achieved by simply allowing the system to cool and the said second liquid material to set. At this stage, changes may be observed in the structure of the said second material due, for example, to curing of the same.

Figure 12:
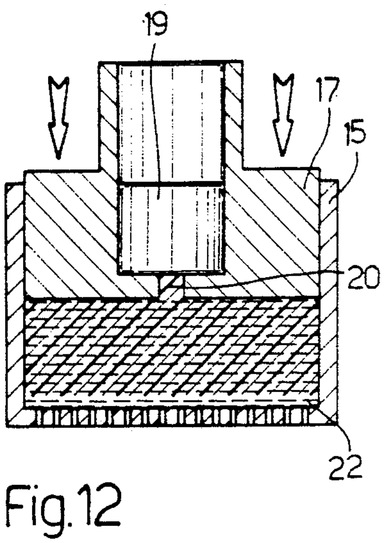

It has been found necessary to dose the liquid material fed into chamber 21 prior to the injection stage, in such a manner as to ensure that it is sufficient to impregnate only a large part of granule mass 16, leaving a nonimpregnated layer 22 (e.g. of about 25%). In like manner, the liquid material flowing inside the gaps between the granules is subjected solely to atmospheric pressure through the porous bottom of vessel 15. The granules, on the other hand, (be they impregnated or not), are subjected to the pressure exerted by piston 17, as shown in FIG. 12. The said pressure is applied evenly over all the contact points between adjacent granules, and is what determines the specific electrical resistance of the resulting material. That is to say, using the same type of granules and liquid material, an increase in the said pressure results, within certain limits, in a reduction of the specific electrical resistance of the resulting material. The said presure must be maintained constant until the liquid material has set, and must be at least equal or greater than the compacting pressure applied in stage 2 (FIG. 9).

Though the said pressure may be selected from within a very wide range, convenient pressure values have been found to range from a few tenths of a $N/mm^2$ to a few $N/mm^2$. For resistors prepared as described in the following examples, the following pressures were selected:

Example 1: 1.17 $N/mm^2$
Example 2: 0.62 $N/mm^2$
Example 3: 1.56 $N/mm^2$
Example 4: 2.35 $N/mm^2$
Example 5: 1.17 $N/mm^2$ The mass of material so formed inside vessel 15 may be cut, using standard mechanical methods, into any shape or size for producing the electric resistor according to the present invention.

To those skilled in the art it will be clear that changes may be made to both the resistor and the process as described and illustrated herein without, however, departing from the scope of the present invention.

In particular, granules 2 arranged inside matrix 1 may be replaced by particles of electrically conductive material of any shape or size, e.g. short fibres.

For preparing the said homogeneous system comprising particles of a first electrically conductive material distributed inside a mass of a second liquid material which, when solidified, is both electrically insulating and flexible, processing stages may be adopted other than those described with reference to FIGS. 8 to 12.

The said homogeneous system, in fact, may be obtained by mixing the said particles mechanically with the said second liquid material, using any appropriate means for the purpose.

According to the aforementioned variation, throughout solidification of the said second material, the said system is forced against a porous (or punched) septum for letting out, through the said septum, at least part of the said second liquid material. The pressure so produced may be maintained until the said second material solidifies, so as to produce the said triaxial precompression in the solidified said second material.

For achieving the said precompression, the said system may be spun throughout solidification of the said second liquid material.

When incorporated in an electric circuit, performance of the resistor according to the present invention is as follows.

If no external pressure is applied on the resistor, and end surfaces 5 and 6 are connected electrically via appropriate conductors, electric current may be fed through the resistor as in any type of rheophore. The density of the current feedable through the resistor has been found to be very high, at times in the region of ten $A/cm^2$. When idle, the resistance of the resistor according to the present invention may, therefore, be low enough to produce an electrical conductor capable of handling a high current density, as required for supplying a circuit component or device. A number of resistance values relative to resistors produced by appropriately selecting the characteristics of the particles and the material of matrix 1, and the parameters of the present process, are shown in the Examples given later on.

Total resistance of the resistor so formed has been found to be constant, and dependent solely on the structure of the resistor, in particular, the number and size of communicating cells 3 in matrix 1, and the number of gaps 4 separating adjacent granules 2.

By appropriately selecting the aforementioned parameters, some of which depend on the process described, a resistor may be produced having a given prearranged resistance. When pressure is applied perpendicularly to surfaces 5 and 6, the electrical resistance measured perpendicularly to the said surfaces is reduced in direct proportion to the amount of pressure applied. FIGS. 3 to 6 show four resistance-pressure graphs by way of examples and relative to four different types of resistors, the characteristics of which will be discussed later on. As shown in the said graphs, the fall in resistance as a function of pressure is a gradual process represented by a curve usually presenting a steep initial portion. Even very light pressure, such as might be applied manually, has been found to produce a considerable fall in resistance. In the case of a resistor having the resistance-pressure characteristics shown in FIG. 6, starting resistance was reduced to less than one percent by simply applying a pressure of around 1 $N/mm^2$ (about 10 $kg/cm^2$). With a different structure and pressures of around 2 $N/mm^2$ (about 20 $kg/cm^2$), starting resistance may be reduced by $\frac{1}{3}$ (as shown in the FIG. 3 graph).

If the pressure applied on the resistor according to the present invention is maintained constant (or zero pressure is applied), electrical performance of the resistor has been found to conform with both Ohm's and Joule's law. For application purposes, it is especially important to prevent the heat generated inside the resistor (Joule effect) from damaging the structure. This obviously entails knowing a good deal about the thermal performance of the material from which the supporting matrix is formed.

Assuming the resistor according to the present invention is capable of withstanding an average maximum temperature of 50° C., under normal heat exchange conditions with an ambient air temperature of 20° C., the density of the current feedable through the resistor ranges from 0.2 A/cm$^2$ (Example 4) to 11 A/cm$^2$ (Example 5) providing no external pressure is applied.

In the presence of external pressure, such favourable performance of the electric resistor according to the present invention is probably due to improved electrical conductivity of granule chains such as C1 and C2 in FIG. 1. In fact, as pressure increases, the conductivity of contacting-granule chains (such as C1) increases due to improved electrical contact between adjacent granules, both on account of the pressure with which one granule is thrust against another, and the increased contact area between adjacent granules. In addition to this, granule chains such as C2, in which the adjacent granules are separated by gaps 4, also become conductive when a given external pressure is applied for bridging the gaps between adjacent pairs of otherwise nonconductive granules.

Total electrical conductivity of the granule chains increases gradually alongside increasing pressure by virtue of matrix 1 being formed from flexible material, and by virtue of the said material being precompressed triaxially. As a result, adjacent granules separated by gaps 4 are gradually brought together, and the contact area of the granules already contacting one another is increased gradually as flexing of the matrix material increases. Each specific external pressure is obviously related to a given resistor structure and a given total conducting capacity of the same. When external pressure is released, the resistor returns to its initial unflexed configuration and, therefore, also its initial resistance rating.

In the said initial unflexed configuration, the electrical performance of the material the resistor is made of has been found to be isotropic, in the sense that the specific resistance of the material is in no way affected by the direction in which it is measured. If, on the other hand, the material the resistor according to the present invention is made of is flexed by applying external pressure in a given direction, the specific resistance of the material has been found to vary continuously in the said direction, depending on the amount and direction of the flexing pressure applied.

To illustrate the electrical performance of the resistor according to the present invention, when subjected to varying external pressure, four resistors featuring different structural parameters will now be examined by way of examples.

A fifth example will also be examined in which the specific resistance of the resistor according to the present invention is sufficiently low for it to be considered a conductor.

EXAMPLE 1

A cylindrical resistor, 12.6 mm in diameter and 7.4 mm high was prepared, as shown in FIGS. 8 to 12, using epoxy resin (VB-BO 15) for matrix 1.

Conducting granules 2 consisted of carbon powder ranging in size from 200 to 250 microns.

On resistors with granules of this sort, the matrix insulating material injected between the granules occupies approximately 56.8% of the total volume of the resistor. The resistor so formed was connected to the electric circuit in FIG. 7, in which it is indicated by number 10. The said circuit comprises a stabilized power unit 11 (with an output voltage, in this case, of 4.5 V), a load resistor 12 (in this case, 10 ohm), and a digital voltmeter 13, connected as shown in FIG. 7. Resistor 10 was subjected to pressures ranging from $7.8 \cdot 10^{-2}$ N/mm$^2$ to $196 \cdot 10^{-2}$ N/mm$^2$.

Resistance was measured by measuring the difference in potential at the terminals of resistor 12 using voltmeter 13, and plotted against pressure as shown in the FIG. 3 graph. From a starting figure of 5.4 Ohm, resistance gradually drops down to 1.78 Ohm as the said maximum pressure is reached.

EXAMPLE 2

A cylindrical resistor, 12.6 mm in diameter and 7.2 mm high was prepared as before using an alpha-cyanoacrylate-base resin for matrix 1 and carbon granules ranging in size from 200 to 250 microns.

Once again, the resistor was connected to the FIG. 7 circuit, the components of which presented the same parmeters as in Example 1. The relative resistance-pressure graph is shown in FIG. 4, which shows a resistance drop from 16 to 5.25 Ohm between the same minimum and maximum pressures as in Example 1.

EXAMPLE 3

A tubular resistor with an outside diameter of 12.6 mm, an inside diameter of 3.5 mm, and 5.4 mm high was prepared as before, using epoxy resin (VB-BO 15) for the matrix and iron granules ranging in size from 50 to 150 microns. On resistors with granules of this sort, the matrix insulating material injected between the granules occupies approximately 55% to the total volume of the resistor. Resistance was again measured as shown in FIG. 7, using a 1000 Ohm load resistor 12 and 4.5 V power unit 11. Pressure was adjusted gradually from $59 \cdot 10^{-2}$ N/mm$^2$ to 7.22 N/mm$^2$ to give the graph shown in FIG. 5, which shows a resistance drop from 1790 to 493 Ohm between minimum and maximum pressure.

EXAMPLE 4

A 2.4 mm high tubular resistor having the same section as in Example 3 was prepared as before using silicon resin for matrix 1 and iron granules ranging in size from 50 to 150 microns.

Resistance was again measured on the FIG. 7 circuit, using a 100 Ohm load resistor 12 and a 1.2 V power unit 11. Pressure was adjusted from $4.2 \cdot 10^{-2}$ N/mm$^2$ to $119 \cdot 10^{-2}$ N/mm$^2$ to give the graph shown in FIG. 6, which shows a resistance drop from 1100 to 8.1 Ohm between minimum and maximum pressure.

EXAMPLE 5

A 3.4 mm high tubular resistor having the same section as in Example 4 was prepared as before, using epoxy resin (VB-ST 29) for matrix 1 and tin granules ranging in size from 50 to 200 microns.

Resistance, measured in the absence of external pressure between the two bases of the tubular-section cylinder, was 0.08 Ohm. The specific resistance of the resistor material, in this case, therefore works out at 0.27 Ohm.cm, which is low enough for the resistor to be considered a conductor. Assuming heat (Joule effect) is dissipated by normal heat exchange in air at a temperature of 20° C., and the maximum temperature withstandable by the resistor is 50° C., the density of the current feedable through this resistor is approximately 11 $A/cm^2$.

I claim:

1. A method of producing an electric resistor for use as an electric conducting element in an electric circuit, and which is capable of varying the electrical resistance as a function of pressure exerted thereon, said method comprising the steps of:

providing an electrically conductive homogeneous material comprising a plurality of conductive particles;

placing said electrically conductive material in a closed vessel;

compacting said electrically conductive material in said closed vessel by subjecting said electrically conductive material to a first predetermined pressure, wherein said first predetermined pressure is exerted by means of a thrust element for a surface of said electrically conductive material;

injecting a liquid material into said closed vessel so as to uniformly mix with said electrically conductive material under pressure and so as to fill gaps between said particles of said electrically conductive material, wherein said injecting includes feeding said liquid material through a channel in said thrust element while gradually withdrawing said thrust element from said surface so as to form a layer of a desired height of said liquid material over said electrically conductive material and then exerting a second predetermined pressure on said layer by means of said thrust element such that said liquid material fills gaps between said particles;

solidifying said liquid material so as to form a flexible and electrically insulating matrix for supporting said particles; and producing triaxial precompression of said liquid material during solidification thereof by applying a third predetermined pressure during said solidification.

2. A method according to claim 1; wherein said third predetermined pressure is maintained substantially constant during solidification of said liquid material and said third predetermined pressure is within the range of approximately a few tenths of a $N/mm^2$ and a few $N/mm^2$.

3. A method according to claim 1; wherein said particles include granules of an electrically conductive material.

4. A method according to claim 1; wherein said particles include short fibers of an electrically conductive material.

5. A method according to claim 1; wherein said step of providing an electrically conductive homogeneous material includes the step of forming a structure of said particles such that the structure of said particles statistically presents each of said particles arranged at least partially contacting adjacent particles so as to define a number of gaps.

6. A method according to claim 1; further including, prior to said step of injecting, the step of obtaining said liquid material by heating a material to a predetermined temperature; and wherein said step of solidifying includes the step of cooling said liquid material.

7. A method according to claim 1; wherein said step of solidifying includes the step of curing said liquid material.

8. A method according to claim 1; wherein said step of producing triaxial compression includes the step of subjecting said particles of said electrically conductive homogeneous material and said liquid material injected thereinto to said third predetermined pressure which is maintained substantially constant until said liquid material has solidified.

9. A method according to claim 8; wherein said third predetermined pressure is not less than said first predetermined pressure at which said particles are compacted.

10. A method according to claim 1; wherein said step of injecting said liquid material includes the step of determining a desired height of the layer of said liquid material over said particles such that a layer of said particles is left free of said liquid material.

11. A method according to claim 1; wherein said particles of said electrically conductive homogeneous material range in size from approximately 10 to 250 microns.

12. A method according to claim 1; wherein said step of solidifying includes the step of forcing said liquid material and said electrically conductive homogeneous material against a porous septum for draining out, through said septum, at least part of said liquid material.

13. A method according to claim 1; wherein said step of solidifying includes the step of spinning said electrically conductive homogeneous and liquid materials during solidification of said liquid material.

* * * * *